United States Patent [19]

Lemery et al.

[11] Patent Number: 4,735,310

[45] Date of Patent: Apr. 5, 1988

[54] AIRCRAFT ENGINE SHIPPING CONTAINER WITH ADJUSTABLE BRACKET SUPPORTS

[75] Inventors: Raymond E. Lemery, Mobile; Thomas V. Blyzka, Magnolia Springs; Maurice Chartier, Mobile, all of Ala.

[73] Assignee: Teledyne Industries, Inc., Los Angeles, Calif.

[21] Appl. No.: 3,786

[22] Filed: Jan. 15, 1987

[51] Int. Cl.[4] .................... B65D 85/68; F16M 11/04
[52] U.S. Cl. .................... 206/319; 108/53.5; 206/512; 211/175; 220/1.5; 248/670; 248/675; 248/680
[58] Field of Search ............. 206/319, 511, 512, 521; 220/1.5, 72; 248/670, 678, 675, 680, 558; 211/175, 195; 108/53.5

[56] References Cited

U.S. PATENT DOCUMENTS

| | | | |
|---|---|---|---|
| 2,300,259 | 10/1942 | Kueppers . | |
| 2,341,801 | 2/1944 | Miller . | |
| 2,418,861 | 4/1947 | Allington | 206/319 |
| 2,418,868 | 4/1947 | Cole et al. | 206/319 |
| 2,428,500 | 10/1947 | Nutt . | |
| 2,460,797 | 2/1949 | Allington | 206/319 |
| 2,549,906 | 4/1951 | Johansson . | |
| 2,729,327 | 1/1956 | Roy | 206/319 X |
| 2,928,535 | 3/1960 | Simmons et al. | 206/319 |
| 2,928,536 | 3/1960 | Weaver, Jr. et al. | 206/319 |
| 3,401,791 | 9/1968 | Stott et al. | 206/319 X |
| 4,098,409 | 7/1978 | Massey | 211/195 |
| 4,117,927 | 10/1978 | Gothsche | 206/319 |
| 4,171,751 | 10/1979 | Schütz | 220/72 X |
| 4,191,356 | 3/1980 | Ashmun et al. | 248/678 |
| 4,287,997 | 9/1981 | Rolfe et al. | 206/511 X |
| 4,511,112 | 4/1985 | Ruehle | 248/678 X |

Primary Examiner—Stephen Marcus
Assistant Examiner—Bryon Gehman
Attorney, Agent, or Firm—Gifford, Groh, VanOphem, Sheridan, Sprinkle and Dolgorukov

[57] ABSTRACT

A shipping container for transporting a variety of aircraft engines includes a base, a cover and a plurality of engine-engageable support portions carried on the base which are at least one of vertically, horizontally and angularly displaceable with respect to the base of the container. The cover is disposable over the base so as to contain the engine therebetween. The support portions are preferably formed on the surface of swing brackets pivotally mounted to vertically adjustable riser brakets, which are telescopically received in corresponding riser support brackets, which are in turn horizontally slidably affixed to base brackets on the container base. The cover and base are externally dimensioned so that one container can be stacked atop another container, or moved by a forklift, and so that individual bases are stackable as well. The container thus reduces the shipping costs associated with nonstackable engine containers and with the prior art need to provide containers of different configuration for each type of engine to be shipped.

7 Claims, 2 Drawing Sheets

AIRCRAFT ENGINE SHIPPING CONTAINER WITH ADJUSTABLE BRACKET SUPPORTS

BACKGROUND OF THE INVENTION

I. Field of the Invention

The present invention relates to containers, and more particularly to a box for shipping aircraft or other engines.

II. Description of the Prior Art

Containers and other apparatus have long been known for shipping one or more engines, such as automobiles or aircraft internal combustion engines. Several of these containers have included rigid frames affixed to the engine or engines. Containers of this type have often included a casing disposed over the frame and engines. Collapsible frame structures have been known as well.

One drawback of prior engine shipping containers has been that the containers have generally been dimensioned for carrying only one particular type of engine. The supports or risers in the container, to which the engine is mounted, are generally immovable and of fixed dimension. Even when the crate is useful for shipping two different types of engines, for example, the type of crate disclosed in U.S. Pat. No. 2,428,500 (H. N. Nutt), the engine-engaging portion on the base of the crib merely pivots into and out of engagement with the shipped engine, but the engine engaging portion is otherwise fixed in horizontal, vertical and angular location. No carrier is known to Applicants which includes one or more supports or risers which are adjustable to a variety of engine types.

SUMMARY OF THE PRESENT INVENTION

The present invention overcomes this and other drawbacks by providing a shipping box for an engine which comprises a base; a cover engageable over the base so as to enclose the engine between the cover and base; at least one and preferably four engine supports mounted to the base and including an engine-engaging support portion; and means attached to the support for vertically, horizontally and angulary displacing the support portion of the support with respect to the base. Advantageously, the supports are connected two each to a pair of elongated base brackets attached to the base. The base brackets are slidable in a transverse direction with respect to the base, while the supports are slidable along the base brackets in a longitudinal direction.

The engine-engaging support portion is preferably formed as part of a swing bracket disposed atop a riser bracket, the swing bracket being pivotally mounted to the riser bracket about an axis parallel to the base bracket. Each riser bracket is connected to the base bracket by a riser support bracket carried by the base bracket, in which the riser bracket is adjustably and telescopically received. The engine-engaging support portions are thus horizontally, vertically and angularly displaceable with respect to the base.

The engine shipping container of the present invention is economic in being adjustable to a variety of engine types without requiring modification or substitution of the individual parts incorporated in the container. As a further cost savings over the prior art containers, the base and cover of the present invention are constructed from polyethylene plastic, the base including a pair of internally disposed reinforcing steel ribs. The base and cover are correspondingly dimensioned so that at least two containers are stackable upon each other, while a plurality of individual bases are stackable as well, for the purpose of reducing the costs of shipping. The base is also preferably useful with covers of differing vertical sizes or differing shapes.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
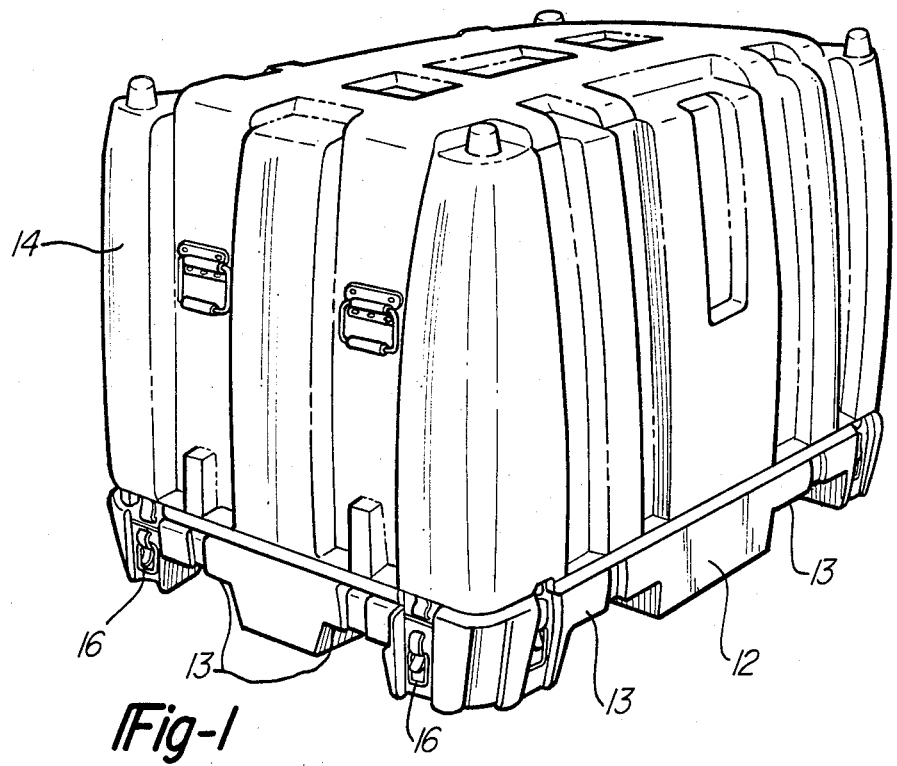
FIG. 1 is a perspective view of the preferred embodiment of the present invention.
Figure 2:
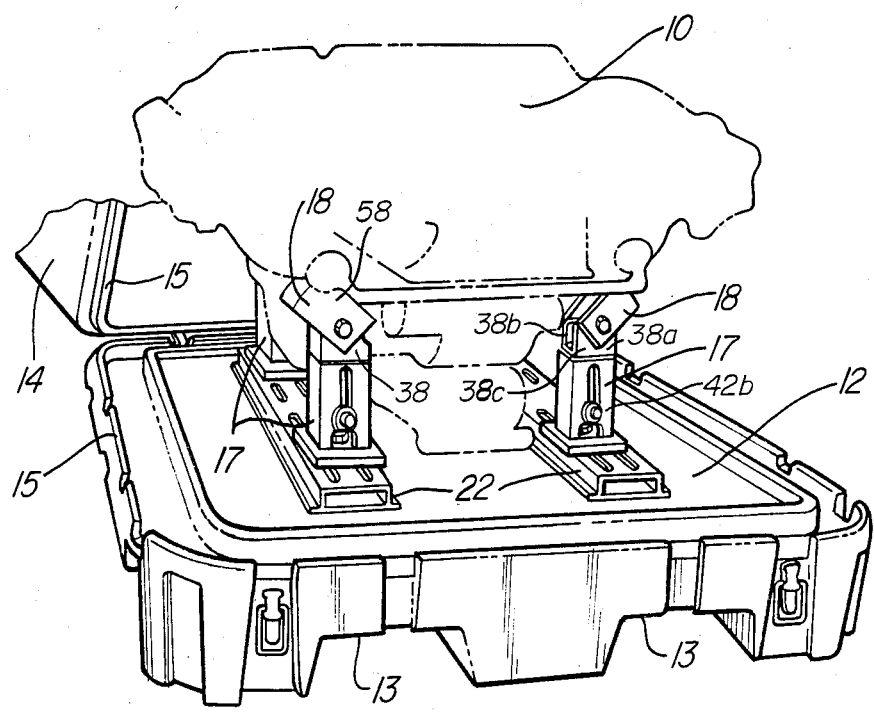
FIG. 2 is another perspective view of the preferred embodiment of the present invention.

With reference now to the FIGS. 1 and 2, the container of the present invention for shipping an aircraft or other engine 10 (shown in phantom) is thereshown and first comprises a base 12 to which the engine 10 is attached by a plurality of supports 17, preferably four in number. A cover 14 is disposable on the base over the engine 10 so as to enclose the engine 10 between the base 12 and cover 14. The base 12 and cover 14 are preferably constructed from polyethylene plastic or other material, and the base 12 is reinforced with two steel ribs (not shown) to ensure sufficient strength to affix the engine 10 within the container. Corresponding lips 15 are disposed at the engaging edges of the base 12 and cover 14 in order to seal the container and encased engine 10 from rainwater or other environmental contamination. A plurality of latches 16 are disposed adjacent the lips 15 for detachably securing the cover 14 to the base 12.

For convenience and economy in shipping, the upper surface of the cover 14 and the lower surface of the base 12 are correspondingly dimensioned, so as to allow a plurality of and preferably two containers and encased engine to be stacked atop one another. The base 14 is also preferably dimensioned so as to be stackable with a plurality of matchingly formed bases as well. The outer surface of the base 12 includes a plurality of forklift channels 13 formed on its lower surface, in order to facilitate movement of the containers. The base 12 has a substantially planar upper surface.

Figure 3:
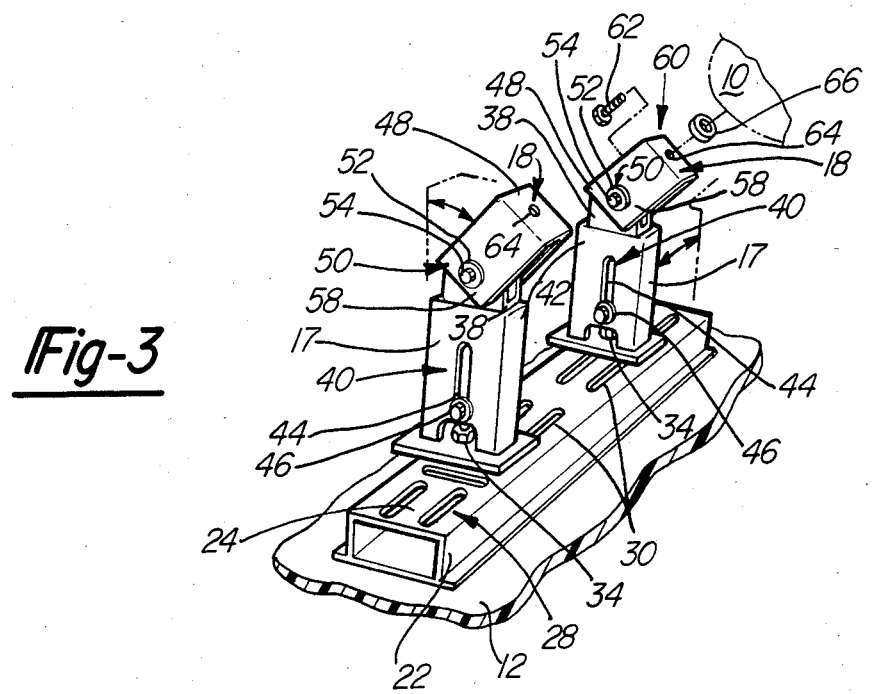
FIG. 3 is a partial perspective view of the preferred embodiment of the present invention.
Figure 4:
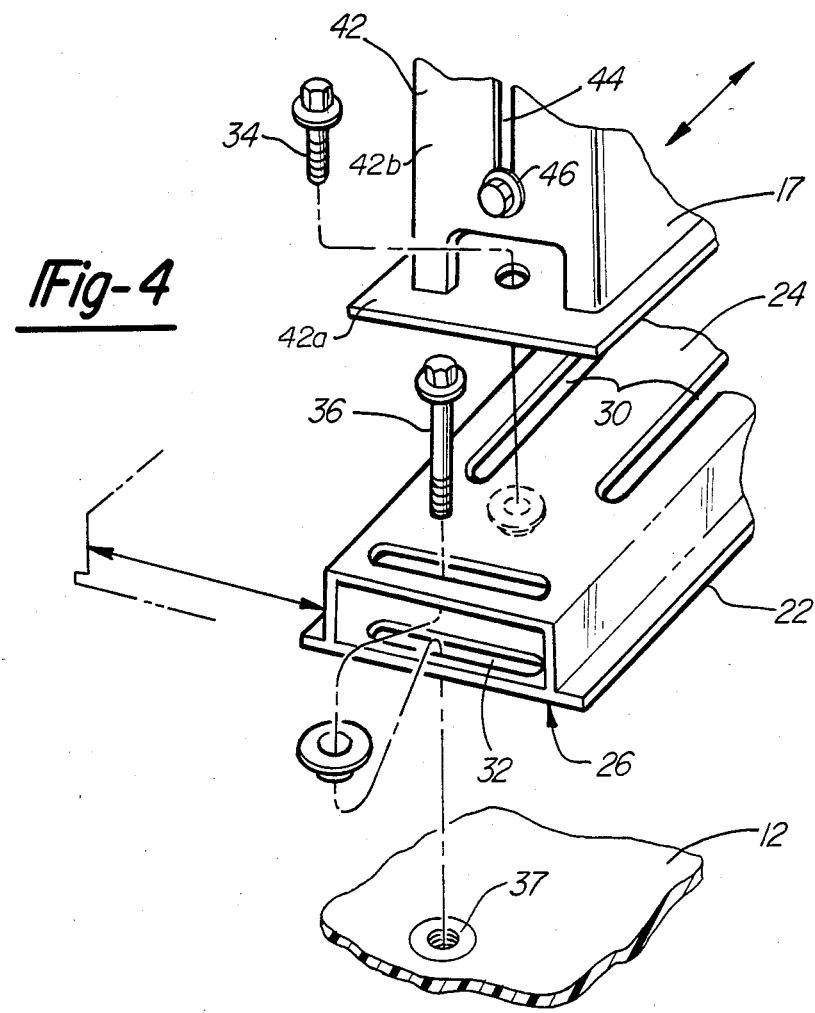
FIG. 4 is another partial perspective view of the preferred embodiment of the present invention taken along line 4—4 of FIG. 3.

With more particular reference now to FIGS. 3 and 4, the containers of the present invention also include an engine-engaging support portion 18 carried by each of the supports 17, and means for at least one of vertically, horizontally and angularly displacing the support portions 18 with respect to the base 12. Most advantageously, the invention comprises means for vertical, horizontal and angular displacement of the support portions 18.

The supports 17 are carried on a pair of base brackets 22 secured to the base 12. The base brackets 22 are preferably each configured as an elongated, tubular rectangular bracket having an upper surface planar portion 24 and a lower planar surface portion 26. A means 28 for horizontally displacing the support portions 18 with respect to the base 12 first comprises a plurality of longitudinal slots 30 formed along the upper surface portion 24 of the base bracket 22, and a plurality of transverse slots 32 formed in the lower surface portion 26 of the base brackets 22, adjacent the ends of the base brackets 22. The horizontal displacement means 28 also comprises a plurality of fasteners 34 (such as paired nuts and bolts) attached to the support 17 and disposed in the longitudinal upper slots 30, and a pair of fasteners 36 affixed to the base 12 and disposed one each through the transverse slots 32 on the lower surface 26 of the base bracket 22. The lower bolts 36 are received in threaded recesses 37 formed in the base 12; while the recesses 37 can be located as desired, they are preferably positioned so as to dispose the pair of base brackets 22 substantially parallel to one another.

The shipping box of the present invention also includes a means 40 for vertically displacing the support portion 18 with respect to the base 12. More particularly, the support 17 preferably comprises a riser bracket 38 connected to the support portion 18, while the vertical displacement means 40 comprises a riser support bracket 42 to which the riser bracket 38 is vertically slidably affixed. The means for such affixment comprises a vertical slot 44 formed in one of the riser bracket 38 and the riser support bracket 42, for example, in the riser support bracket 42, and a fastener 46 affixed through the slot 44 to the other of the riser support bracket 42 and the riser bracket 38, for example, to the riser bracket 38. The fastener preferably comprises a bolt, disposed in a threaded bore in the riser bracket 38, so as to permit the riser bracket 38 to be fixed in any desired location along the riser support bracket 42.

Riser support bracket 42 is preferably provided with a lower load supporting portion 42a which movably supports the support bracket on, and in load transmitting relationship with, the upper surface portion of base bracket 22. The support member 42 further has a section 42b extending vertically upwardly from the lower support portion 42a.

Fasteners 34 and slots 30 provide a means for attaching the riser support member to base bracket 22 for movement of the riser support bracket along the upper surface portion 24 of base bracket 22 in a direction transverse to the direction of movement provided for base bracket 22 by slots 32 and fasteners 36. Fasteners 34 and slots 30 also provide for affixing riser support member 42 to base bracket 22 at selected relative positions of movement between the two members 42 and 22.

Each riser bracket 38 is provided with a vertically extending leg section 38a, FIG. 2, which preferably, as shown, is in the form of two legs 38b and 38c. Section 42b of riser support bracket 42 is preferably in the form of a box section transversely of its height, and has slots 44 extending through the facing sides of the box section. Legs 38b and 38c extend vertically downward into the bracket 38 closely adjacent to and parallel to the facing sides of the box section of riser bracket 38 but with sufficient clearance so that riser bracket 38 can when released slide vertically within riser bracket 38. Fasteners 46 and slots 44 provide the means for affixing leg section 38a, and thus the riser bracket 38 to the vertically extending section 42b of the riser support bracket 38 at selected vertical positions of the two members 42 and 38 relative each other.

Preferably, the support 17 also includes a swing bracket 48 attached atop the riser bracket, which carries the support portion 18 thereon, for example, formed as part of the surface of the swing bracket 48. A means 50 for angularly displacing the support portion 18 with respect to the base 12 comprises a means 52 for pivoting the swing bracket 48 about an axis parallel to the base 12 and preferably parallel to the particular base bracket 22 to which the swing bracket 48 is connected. The pivoting means 52 preferably comprises at least one fastener 54 connected to the riser bracket 38 and disposed through an aperture in a depending leg 58 of the swing bracket 48. Preferably, the swing bracket 48 possesses two legs 58, and thereby incorporates a pair of apertures, the means 52 then including a pair of the fasteners 54.

The shipping box of the present invention lastly includes a means 60 for securing the engine 10 to the support portions 18 of the supports 17. Preferably, the securing means 60 comprises a plurality of bolts 62 passing through apertures 64 formed in the support portions 18, with resilient spacer pads 66 disposed between the engine 10 and the support portion 18, in order to prevent marring of the finish of the engine.

Use of the shipping box of the present invention is straightforward. The latches 16 are detached so as to allow removal of the cover 14 from the base 12. The fasteners 34, 36, 46 and 54 are sequentially loosened so as to allow transverse horizontal, longitudinal horizontal, vertical, and angular displacement of the support portions 18, respectively, with respect to the base 12, so as to dispose the support portions 18 adjacent correspondingly engageable portions of the engine 10. The fasteners 34, 36, 46 and 54 are then tightened, after such movement of the base bracket 22, the riser bracket 38, the riser support bracket 42 and the swing bracket 48, so as to fix the locations of the support portions 18. The engine 10 is then positioned on the support portions 18, and the securing means 60 employed to secure the engine 10 to the support portions 18, and thus to the base 12. A plastic bag can be disposed over the engine, either before or after affixment of the engine to the support portions 18, so as to maintain the engine in a clean and dry condition. The cover 14 is then disposed over the base 12, and secured thereto by the latches 16. The lips 15 engage with one another so as to keep water or environmental contamination away from the engine 10 during shipping. Individual bases or pairs of affixed bases and covers can be moved by engagement of the tines of a forklift in the forklift channels 13.

The shipping box construction of the present invention thus provides secure containment of the shipped engine in a straightforward manner, yet one which is readily adaptable to engines of various types without changing the parts of the box construction or materially altering the configuration of the box, saving the costs previously associated with providing boxes for differing engine types. Having described our invention, however, many modifications thereto will become apparent to those skilled in the art to which it pertains, without deviation from the spirit of the invention, as defined by the scope of the appended claims.

We claim:
1. A shipping container for an engine comprising:
a base having a substantially planar upper surface,
a first bracket comprising a member having a lower portion supporting said bracket on said base and an upper portion substantially parallel to said lower portion and means attaching said first bracket to said base in load supporting relationship therewith for movement of said bracket upon said base in at least one longitudinal direction with respect to said base and for fixing said bracket to said base in selected relative positions of said movement, a support member having a load supporting portion moveably supporting said support member on and in load transmitting relationship with said upper portion of said first bracket, means attaching said support member to said first bracket for movement of said support member along said upper portion of said first bracket in a direction transverse to said at least one longitudinal direction, and for affixing said support member to said first bracket in selected relative positions of the latter said movement of said support member with respect to said first bracket, said support member further comprising a vertically extending section extending upward from said load supporting portion of said support member, a second bracket member comprising a leg section extending parallel to said vertically extending section of said support member and moveable vertically with respect to said vertically extending section of said support member, means for affixing said leg section to said vertically extending support member section at selected vertical positions of said second bracket member relative to said support member, a third bracket member having an engine supporting portion formed therein, and a section depending downwardly from said engine supporting portion, the latter said section being pivotally supported in load transmitting relationship on said leg section of said second bracket member for pivotal movement of said third bracket member relative said second bracket member and means for securing said third bracket member in a selected position of said relative pivotal movement.

2. The shipping container of claim 1 wherein said third bracket member is mounted for pivotal movement relative said second bracket member about an axis extending parallel to said upper surface of said base.

3. The shipping container of claim 1 wherein said section extending vertically upward from said load supporting portion of said support member comprises a box section transversely of its height and said leg section of said second bracket member extends vertically within said box section.

4. The shipping container of claim 3 wherein said leg section of said second bracket member comprises a pair of legs each of which extends respectively in parallel closely adjacent facing relationship with a side of said box section with sufficient clearance for movement of said second bracket member with respect to said support member when the latter two members are not affixed in selected relative positions by said means for affixing said leg section to said support member.

5. The shipping container of claim 1 wherein said third bracket member comprises a pair of legs pivotally connected to said leg section of said second bracket member.

6. The shipping container of claim 1 wherein said latter section of said third bracket member is supported for pivotal movement about an axis extending parallel to said upper surface of said base.

7. The invention according to claim 1 wherein said first bracket comprises an elongated tube of rectangular cross member having an upper portion abutting said support member and a lower portion abutting said base, and wherein said means attaching said first bracket to said base comprises: a plurality of slots formed in each of said upper and said lower portions, said slots on one of said upper and said lower portions being disposed transverse to said slots on the other of said upper and said lower fasteners connected to said base and disposed in two of said slots in said lower portion, such that said first bracket is movably attached to said base and can be affixed to said base in selected positions relative said base.

* * * * *

UNITED STATES PATENT AND TRADEMARK OFFICE
CERTIFICATE OF CORRECTION

PATENT NO. : 4,735,310

DATED : April 5, 1988

INVENTOR(S) : Raymond E. Lemery, Thomas V. Blyzka and Maurice Cartier

It is certified that error appears in the above-identified patent and that said Letters Patent is hereby corrected as shown below:

IN THE ABSTRACT:

Line 18, delete "art" after "prior".

Col. 2, line 49 after "engine", insert --10--; delete "14" and insert --12--.

line 51 after "bases", insert --12--.

Col. 3, line 33 after "fastener", insert --46--;

Col. 4, line 2 after "bracket", insert --38--;

line 24 after "engine", insert --10--.

Signed and Sealed this

Fourth Day of October, 1988

Attest:

DONALD J. QUIGG

*Attesting Officer*   *Commissioner of Patents and Trademarks*